United States Patent [19]

Nakayama

[11] 4,400,087
[45] Aug. 23, 1983

[54] LIGHT MEASURING CIRCUIT

[76] Inventor: Yasuo Nakayama, No. 20-18, Shibakubo-cho 1-chome, Tanashi-shi, Tokyo, Japan

[21] Appl. No.: 262,895

[22] Filed: May 12, 1981

[30] Foreign Application Priority Data

May 13, 1980 [JP] Japan .................. 55-63205

[51] Int. Cl.³ .................. G01J 1/46; H05B 41/14
[52] U.S. Cl. .................. 356/215; 315/241 P; 354/33
[58] Field of Search .................. 356/215; 315/241 P; 354/32, 33, 34

[56] References Cited

U.S. PATENT DOCUMENTS

Re. 28,025  5/1974  Murata et al. .................. 315/241 P

Primary Examiner—Bruce Y. Arnold
Attorney, Agent, or Firm—McGlew and Tuttle

[57] ABSTRACT

A light measuring element which is provided with a pulse signal generator for generating pulse signals the duty ratio of which varies in accordance with a coefficient related to the exposure for photographing, a switching element which is driven by the output pulse signals from the pulse signal generator, and a light integrating circuit which includes a photo detector and an integrating capacitor and provides the voltage across the integrating capacitor as a light measure output. The light integrating circuit performs an intermittent light integrating operation by the action of the switching element. The integration period of the light integrating circuit is varied by varying the duty ratio of drive signals to the switching element which are supplied from a pulse signal generator, which duty ratio varies with a coefficient related to the proper exposure for photographing.

10 Claims, 9 Drawing Figures

FIG.1
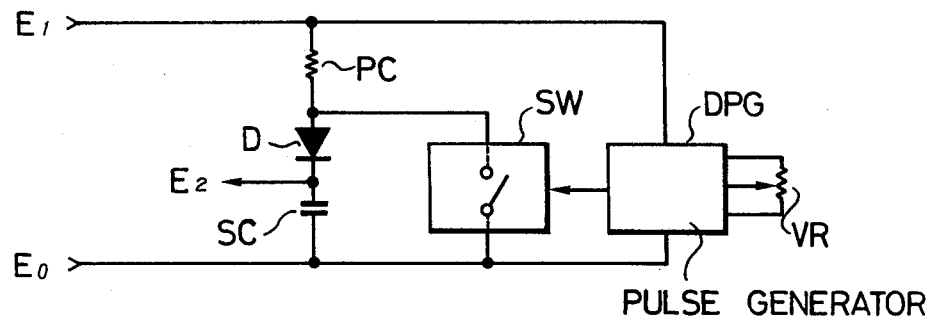
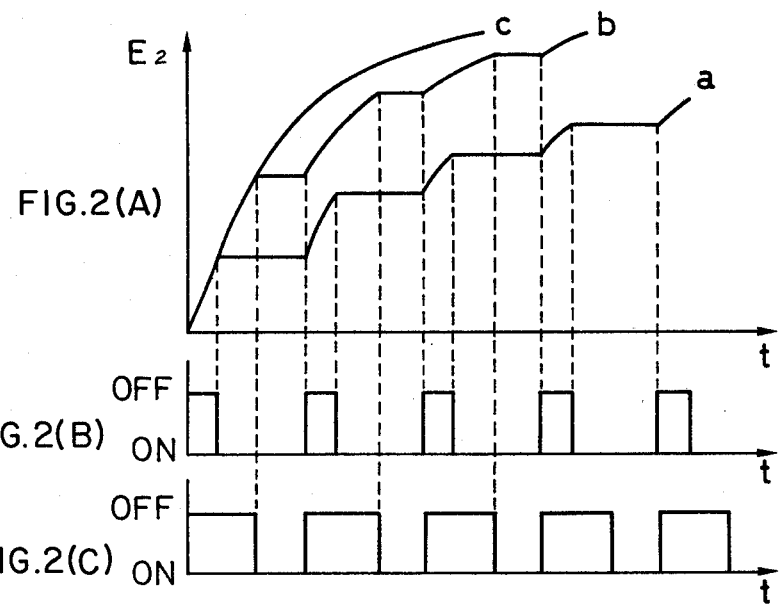

ically changing over integrating capacitors in response to variations of the exposure conditions, integrating capacitors are required in huge numbers; this is impractical and almost impossible. Therefore, in the prior art about five sensitivity set values at most are determined so that the light measuring sensitivity may fit only for the film sensitivity most widely used, in many cases, the even-multiple series of ASA Speed 25. Accordingly, there is the problem such that under exposure conditions other than specified ones, the light measuring sensitivity cannot be adjusted to a proper light control value. Such a problem can be solved by the system of changing the voltage to be

LIGHT MEASURING CIRCUIT

BACKGROUND OF THE INVENTION

1. Field of the Invention

The present invention relates to a light measuring circuit which is applicable to an automatic flash unit or electronic shutter of a camera.

2. Description of the Prior Art

Generally, in a light measuring circuit for use in an automatic flash unit, an electronic shutter of cameras and so forth, the light measuring sensitivity must be changed in accordance with an exposure condition which is provided by a combination of coefficients concerning exposure such as the film sensitivity, the F-number of a camera lens, etc.; heretofore, a variety of light measuring sensitivity switching systems have been proposed. For example, Japanese Utility Model Application Gazette No. 13953/79 sets forth such a system in which a plurality of integrating capacitors of different capacitances are selectively changed over to alter the charging time constant of a light integrating circuit, whereby to switch the light measuring sensitivity. This system is highly stable in operation independently of a temperature change, high in response speed and capable of responding to a wide variety of exposure conditions as compared with other systems, for example, of the type that the light measuring sensitivity is switched by changing a voltage to be applied to a photodetector or by changing a reference voltage for detecting an integrated voltage level; therefore, the abovesaid system is now widely put to practical use. In this system, however, since a plurality of integrating capacitors having discrete capacitance values are changed over, the light measuring sensitivity can be switched only in a stairstep manner and this poses the following problems:

Namely, films now placed on the market have ten-odd kinds of sensitivities, mainly ranging from ASA Speed 25 to ASA Speed 800, and they are mostly divided into a series of even multiples of 25 and a series of even multiples of 32. The practical range of the F-number of camera lenses is from 1.4 to 22; the F-number is indicated in the form of F1.4, F2.0, F2.8, . . . by a geometric progression using $\sqrt{2}$ as a common ratio and a click stop is usually provided midway between adjacent values to subdivide the F-number. Since the values of the F number of the camera lens and the film sensitivity are thus diversified, the exposure conditions which are determined by combinations of them are very large in number. If the light measuring circuit of the automatic flash unit cannot set the sensitivity in response to all of such a great number of exposure conditions, then photographing conditions are limited or correct exposure cannot be obtained.

However, for switching the sensitivity by the aforesaid system of the type selectively changing over integrating capacitors in response to variations of the exposure conditions, integrating capacitors are required in huge numbers; this is impractical and almost impossible. Therefore, in the prior art about five sensitivity set values at most are determined so that the light measuring sensitivity may fit only for the film sensitivity most widely used, in many cases, the even-multiple series of ASA Speed 25. Accordingly, there is the problem such that under exposure conditions other than specified ones, the light measuring sensitivity cannot be adjusted to a proper light control value. Such a problem can be solved by the system of changing the voltage to be applied to the photocell or changing the reference voltage for the detection of an integration voltage level, but these systems have the drawback that they cannot respond to a wide variety of exposure conditions, resulting in the photographing conditions being limited, as referred to previously.

SUMMARY OF THE INVENTION

It is an object of the present invention to provide a light measuring circuit which is capable of varying the light measuring sensitivity continuously over a wide range.

Another object of the present invention is to provide a light measuring circuit with is suitable for use in an automatic flash unit.

Yet another object of the present invention is to provide a light measuring circuit which is suitable for use with an electronic shutter of cameras.

Briefly stated, the light measuring circuit of the present invention is provided with a pulse signal generator for generating pulse signals the duty ratio of which varies with a coefficient concerning the exposure for photographing, a switching element which is driven by the output pulse signals from the pulse signal generator, and a light integrating circuit having its time period of integration controlled by the ON-OFF operation of the switching element. Changing the duty ratio of the output pulse signal from the pulse signal generator, the ON and OFF periods of the switching element vary to cause a change in the integration period of the light integrating circuit thereby changing the light measuring sensitivity of the light measuring circuit. Since the duty ratio of the pulse signals can be varied continuously over a wide range, the light measuring sensitivity of the light measuring circuit can also be varied over a wide range and continuously.

BRIEF DESCRIPTION OF THE DRAWINGS

FIGS. 1, 3 and 4 are circuit diagrams illustrating the principal parts of embodiments of the present invention;

FIGS. 2(A), 2(B) and 2(C) show graphs explanatory of the operation of the embodiment depicted in FIG. 1;

DESCRIPTION OF THE PREFERRED EMBODIMENTS

Figure 3:
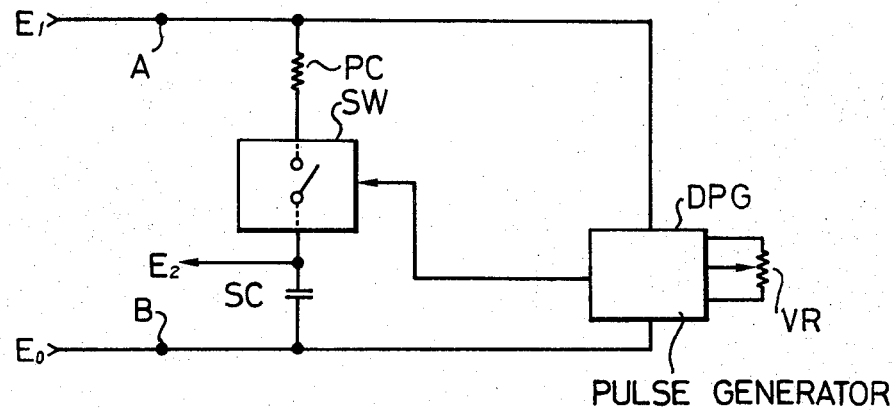

FIG. 1 is a circuit diagram illustrating an embodiment of the present invention. Reference character PC indicates a photo detector such as a photo transistor, photoconductive cell or the like; SC designates integrating capacitor; D identifies a diode; SW denotes a switching element; DPG represents a pulse signal generator for generating pulse signals the duty ratio of which is variable; VR shows a variable resistor; and $E_1$ and $E_0$ refer to drive voltages. FIG. 2 shows variations in a terminal voltage $E_2$ of the integrating capacitor SC and in the operation of the switching element SW with time in the operation of the circuit depicted in FIG. 1.

In FIG. 1, the photo detector PC and the integrating capacitor SC form a light integrating circuit and the terminal voltage $E_2$ of the integrating capacitor SC is provided as a light-measured output. When in its ON state, the switching element SW by-passes a current flowing in the integrating capacitor SC to prevent its charging and when the switching element SW is in the OFF state, charging of the integrating capacitor SC is resumed; thus, the integration period of the light integrating circuit is controlled. The switching element SW is driven by output pulses from the pulse signal generator DPG. The pulse signal generator DPG is arranged so that the duty ratio of the output pulses may vary with the value of the variable resistor VR which changes in accordance with coefficients concerning the exposure for photographing. The diode D is provided for preventing that charges stored in the integrating capacitor SC are discharged when the switching element SW is in the ON state.

With such an arrangement, when the driven voltage $E_1$ is applied to the light integrating circuit and the switching element SW is repeatedly turned ON and OFF by the output pulses from the pulse signal generator DPG as shown in FIG. 2(B), the integrating capacitor SC is intermittently charged via the photodetector PC and the charging voltage, that is, the light-measured output $E_2$ is such, for example, as indicated by a curve a in FIG. 2(A). In the case where the switching element SW is repeatedly turned ON and OFF by pulse signals of large duty ratio, for example, as shown in FIG. 2(C), the light-measured output $E_2$ is such, for instance, as indicated by a curve b in FIG. 2(A).

As will be appreciated from the above, by selecting long the conduction period of the switching element the inclination of the light integrating characteristic curve can be made gentle, whereby the light measuring sensitivity can be lowered. Conversely, by reducing the conduction period of the switching element SW per unit time, the inclination of the light integrating characteristic curve can be made sharp, permitting an increase of the light measuring sensitivity. Since the conduction time of the switching element per unit time can freely be varied by changing the duty ratio of the output pulses from the pulse signal generator DPG, an arbitrary integrating characteristic can be obtained by the change of the duty ratio. Accordingly, the light measuring sensitivity can be changed over substantially continuously. When the switching element SW is always in the OFF state, an integration characteristic obtainable with the prior art such, for example, as indicated by a curve c in FIG. 2(A) is provided and, in this case, the light measuring sensitivity becomes the highest (fit for a high ASA Speed value or a small F-number). When the switching element SW is always in the ON state, no integrating operation is performed and, in the case of an autostrobo, it becomes a conventional strobe giving off its full quantity of light.

FIG. 3 is a circuit diagram illustrating another embodiment of the present invention, the parts corresponding to those in FIG. 1 being identified by the same reference characters. In this embodiment the switching element SW for controlling the integration period of the light integrating circuit is connected in series with the photo detector PC and the integrating capacitor SC. When the switching element SW is in the ON state, the light integrating circuit performs the integrating operation but stops the operation when the switching element SW is in the OFF state. The present embodiment also produces the same effects as those obtainable with the embodiment described previously. The embodiment depicted in FIG. 3 does not require such a diode D as employed in FIG. 1. Further, the position of connection of the switching element SW is not limited specifically to the illustrated one but it is also possible to insert the switching element SW, for example, at a point A or B in FIG. 3 so that the drive voltage $E_1$ to be applied to the light integrating circuit may be turned ON and OFF.

Figure 4:
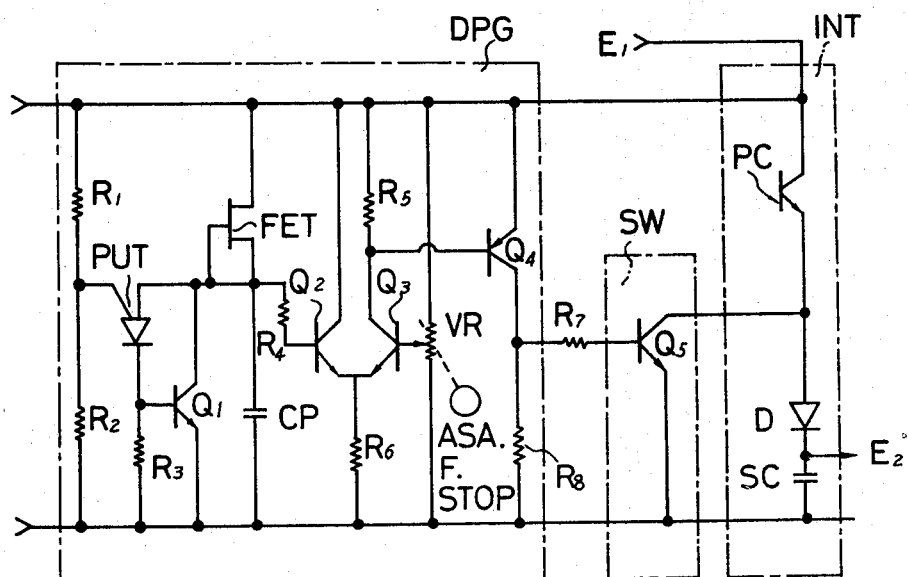

FIG. 4 is a circuit diagram illustrating another embodiment of the present invention. In FIG. 4 the parts corresponding to those in FIG. 1 are identified by the same reference characters. Reference character PUT indicates a sawtooth wave generating element such as a programmable unijunction transistor or the like; FET designates a field effect transistor; $Q_1$ to $Q_5$ identify transistors; CP denotes a capacitor; $R_1$ to $R_8$ represent resistors; and INT show light integrating circuit.

In FIG. 4, the pulse signal generator DPG comprises a sawtooth wave generator circuit formed by the sawtooth wave generating element PUT, the field effect transistor FET, the transistor $Q_1$ and the capacitor CP, a level comparator composed of the transistors $Q_2$ and $Q_3$, and the transistor $Q_4$ for phase inversion use. The oscillation period of the sawtooth wave generator circuit depends on the product of the internal impedance of the field effect transistor FET and the capacitance of the capacitor CP, and the sawtooth generator circuit is capable of oscillation at high frequencies by the action of the transistor $Q_1$. Further, since the field effect transistor FET has a constant-current action, a sawtooth wave of excellent linearity can be obtained. This sawtooth wave is shaped into a rectangular wave by the level comparator composed of the transistors $Q_1$ and $Q_2$ and the rectangular wave is phase-inverted by the transistor $Q_4$ and then applied to the base of the transistor $Q_5$ which forms the switching element SW. In this case, a change in the pulse width of the rectangular wave is performed by adjusting the value of the variable resistor VR to change a reference voltage for comparison use and, corresponding to the amount of turn of a knob of the variable resistor VR, scales such as ASA Speed or F-number scales are provided for calibration. The switching element SW and the light integrating circuit are identical in operation with those utilized in the embodiment of FIG. 1 and the terminal voltage of the integrating capacitor SC is delivered as a light-measured output to the outside.

The sensitivity of the light measuring circuit is in proportion to the duty ratio of the pulse signals which are provided to the switching element SW and, in general, the sensitivity becomes one-half of its maximum when the duty ratio is 50%. In terms of the F number it corresponds to a figure larger than a maximum by one stage and in terms of ASA Speed it corresponds to a value ½.

For example, in the case of applying the circuit of this embodiment to a light measuring circuit of an autostrobo, since it is technically easy to produce pulses having a minimum duty ratio of about 1%, by selecting the repetitive period of the pulse signals to be approximately 30 μs, it is possible to change over the sensitivity continuously over a little more than six stages in terms of the F-number. In the case of applying the circuit of this embodiment to an electronic shutter of cameras, the repetitive period of the pulse signals may be selected to be 1 ms and since a minimum pulse width of 0.3 μs or so is easy to obtain, it is possible to perform sensitivity switching which follows a quantity-of-light ratio or intensity ratio of 1 to 3000.

While in the circuit arrangement of FIG. 4 the pulse signal generator DPG is shown to be composed of the sawtooth wave generator circuit and the level comparator, it is also possible to form the pulse signal generator DPG, for example, by a combination of a multivibrator and a monostable multivibrator or a pulse generator and a delay circuit, or a digital pulse generator which comprises a crystal oscillator circuit and a digital processing circuit for digitally processing output pulses from the crystal oscillator circuit to form pulse signals of variable duty ratio.

Figure 5:
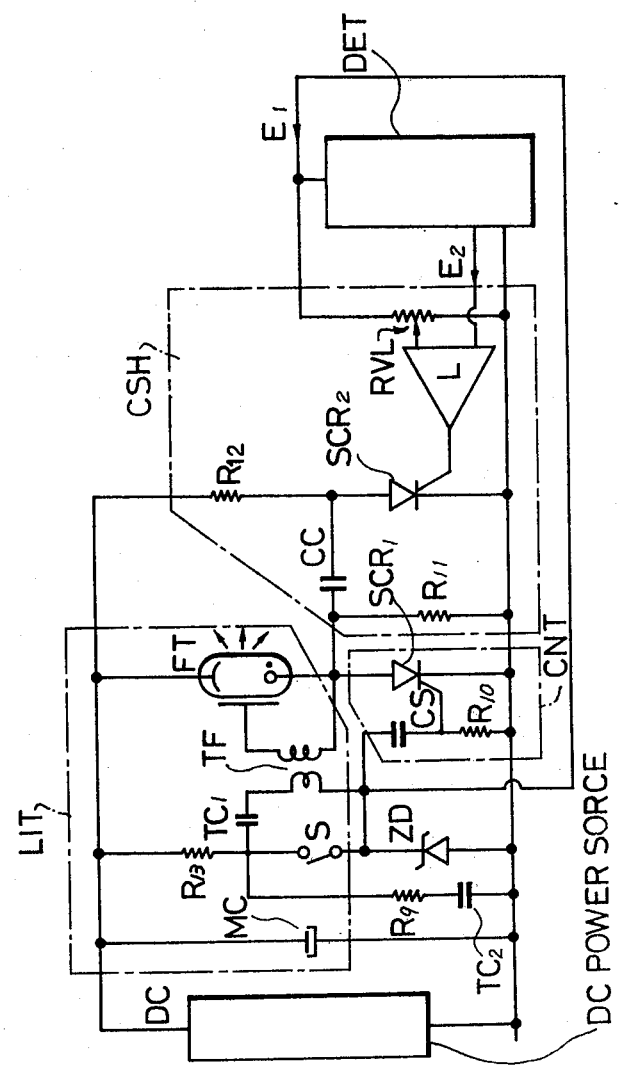
FIG. 5 is a circuit diagram illustrating an example of the arrangement of a series control type auto-strobo employing the light measuring circuit of the present invention.

FIG. 5 is a circuit diagram illustrating, by way of example, the arrangement of a series control type autostrobo employing the light measuring circuit of the present invention. Reference character FT indicates a discharge tube; TF designates a trigger transformer; $TC_1$ identifies a trigger capacitor; MC denotes a main capacitor; and S represents a switch. These elements constitute a light emitting unit LIT. Reference characters $SCR_1$ and CS respectively show a thyristor and a capacitor which make up a control unit CNT. Reference character CC refers to a capacitor for commutation; $SCR_2$ indicates a thyristor; L designates a level detector; and RVL identifies a variable resistor for setting a predetermined control level. These elements forms a light control signal generator unit CSH. Reference character DC denotes a DC power source; ZD represents a Zener diode; $TC_2$ shows a capacitor which serves as a power source for driving the light measuring circuit; $R_9$ to $R_{12}$ refer to resistors; and DET indicates the light measuring circuit of the present invention.

In the case of applying the light measuring circuit DET of the present invention to the series control type auto-strobo, use is made of such an arrangement as depicted in FIG. 5, in which a reference voltage occurring across the Zener diode upon closure of the switch S is applied as a drive voltage $E_1$ to the light measuring circuit DET and a light measured output $E_2$ and a predetermined control level provided by the variable resistor RVL are compared by the level detector L and the resulting compared signal therefrom is supplied to the thyristor $SCR_2$ to drive it.

Figure 6:
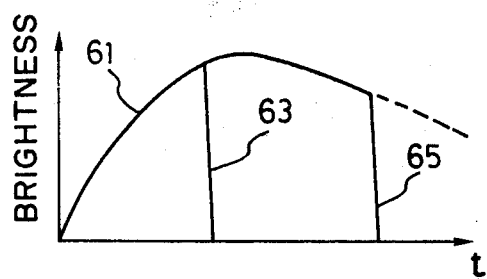
FIGS. 6(A) and 6(B) show graphs explanatory of the operation of the circuit depicted in FIG. 5.
Figure 6:
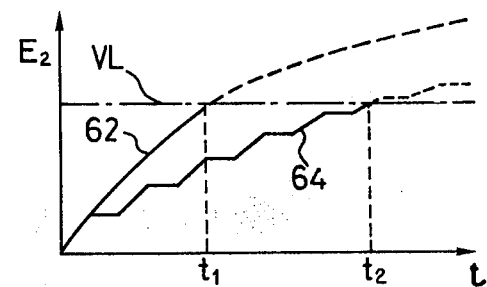

FIG. 6 shows the relationships between variations in the light measured output $E_2$ with time and the quantity of light emitted in the case of the auto-strobo being activated. With reference to this, the operation of the circuit shown in FIG. 5 will hereinbelow be described. By the closure of the switch S the discharge tube FT is triggered and, at the same time, the thyristor $SCR_1$ which is a series control switching element conducts and the discharge tube FT starts to emit light, the quantity of which varies with time as indicated by a curve 61 in FIG. 6(A). At this time, the power source voltage $E_1$ for driving the light emitting circuit DET is also applied to the light measuring circuit DET in relation to the closure of the switch S, causing the light measuring circuit DET to start its operation. Thus what is called synchronous light measurement is started.

In the case where the light measuring circuit DET has been set to the highest sensitivity, that is, where a reference voltage of the variable resistor VR has been set so that, for example, the transistor $Q_5$ used in FIG. 4 may always remain in the OFF state, the light measured output $E_2$ undergoes the sharpest change, for example, as indicated by a curve 62 in FIG. 6(B). Consequently, the level detector L which compares the predetermined control level VL and the light measured output $E_2$ provides a light control signal to the gate of the thyristor $3CR_2$ at a moment $t_1$ and, as a result of this, the thyristor $SCR_1$ is turned OFF by stored charges of the commutation capacitor CC, stopping the radiation of the discharge tube FT substantially at the moment $t_1$, as indicated by a curve 63 in FIG. 6(A).

Next, for instance, in the case where the value of the variable resistance VR has been set so that the transistor $Q_5$ in FIG. 4 may be driven by pulse signals with a duty cycle of 50%, the light measured output $E_2$ undergoes changes with time such, for example, as indicated by a curve 64 in FIG. 6(B); accordingly, the start of operation of the level detector L is retarded as compared with the above case and the light control signal is generated at a moment $t_2$. Consequently, the discharge tube FT continues radiation until about the moment $t_2$, for example, as indicated by a curve 65 in FIG. 6(A).

In this way, the sensitivity of the light measuring circuit DET can be changed over by changing the operation period of the light integrating circuit of the light measuring circuit DET per unit time and the change of the operation period of the light integrating circuit can be achieved by a suitable selection of the value of the variable resistor VR. Accordingly, by providing scales of the ASA Speed or F-number corresponding in the amount of turn of the knob of the variable resistor VR for calibration, it is possible to change the sensitivity of the light measuring circuit continuously in accordance with exposure conditions.

As has been described in the foregoing, the light measuring circuit of the present invention is designed so that the integration period of the light integrating circuit per unit time may be changed in accordance with a coefficient related to the exposure for photographing; hence, there is the effect that the sensitivity can be changed over continuously over a wide range. Accordingly, the light measuring circuit of the present invention is of great utility when employed in an auto-strobo or an electronic shutter of cameras since the range of photographing conditions adoptable is enlarged. The present invention is not limited specifically to the foregoing embodiments and may be subject to various modifications and variations. For example, it is possible to combine the present invention with a system of changing over a plurality of integrating capacitors of different capacitances, by which the light measuring sensitivity can be varied continuously over a wider range.

It will be apparent that many modifications and variations may be effected without departing from the scope of the novel concepts of this invention.

What is claimed is:

1. A light measuring circuit comprising:
   a light integrating circuit including a photodetector and an integrating capacitor and wherein the voltage across the integrating capacitor serves as a light measure output;
   a switching element for controlling the integration period of the light integrating circuit; and
   a pulse signal generator for supplying the switching element with pulse signals which serve as drive signals, the duty ratio of which varies with a coefficient related to a proper exposure for photographing.

2. A light measuring circuit according to claim 1 wherein the light integrating circuit is formed by a series connection of the photodetector and the integrating capacitor via a diode, and wherein the switching element is connected in parallel with a series circuit of the diode and the integrating capacitor.

3. A light measuring circuit according to claim 1 wherein the photodetector and the integrating capacitor are connected in series via the switching element.

4. A light measuring circuit according to claim 2 or 3 wherein the pulse signal generator is composed of a sawtooth wave generator circuit and a comparator for forming a rectangular wave by comparing the output from the sawtooth wave generator circuit with a reference voltage the value of which varies with a coefficient related to the exposure for photographing.

5. A light measuring circuit according to claim 4 wherein the coefficient related to the proper exposure for photographing is the sensitivity of a film used.

6. A light measuring circuit according to claim 4 wherein the coefficient related to the proper exposure for photographing is the F-number of a camera lens.

7. A light measuring circuit according to claim 4 wherein the coefficient related to the proper exposure for photographing is the sensitivity of a film used and the F-number of a camera lens.

8. A light measuring circuit according to claim 2 or 3 wherein the pulse signal generator is composed of a crystal oscillator circuit and a digital processing circuit for digitally processing output pulses from the crystal oscillator circuit to form pulse signals of variable duty ratio.

9. A light measuring circuit according to claim 1 wherein said light measure output is provided as a signal to be compared by a level detector for generating a light control signal in an automatic flash unit.

10. A light measuring circuit according to claim 1 wherein a plurality of integrating capacitors of different capacitances are selectively employed.

* * * * *